Figure 8:
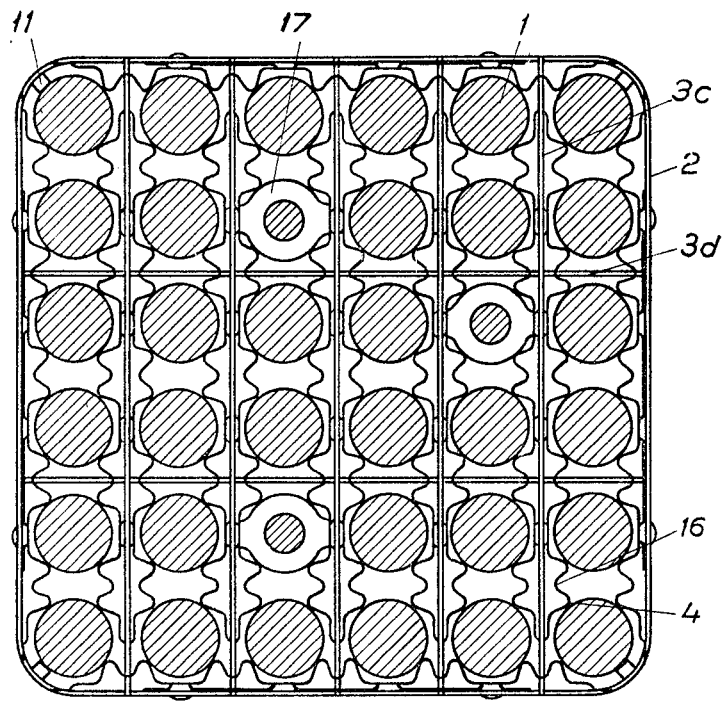

April 30, 1968 C. GLANDIN ET AL 3,380,890
SPACER FOR FUEL ASSEMBLIES
Filed May 17, 1965 5 Sheets-Sheet 1
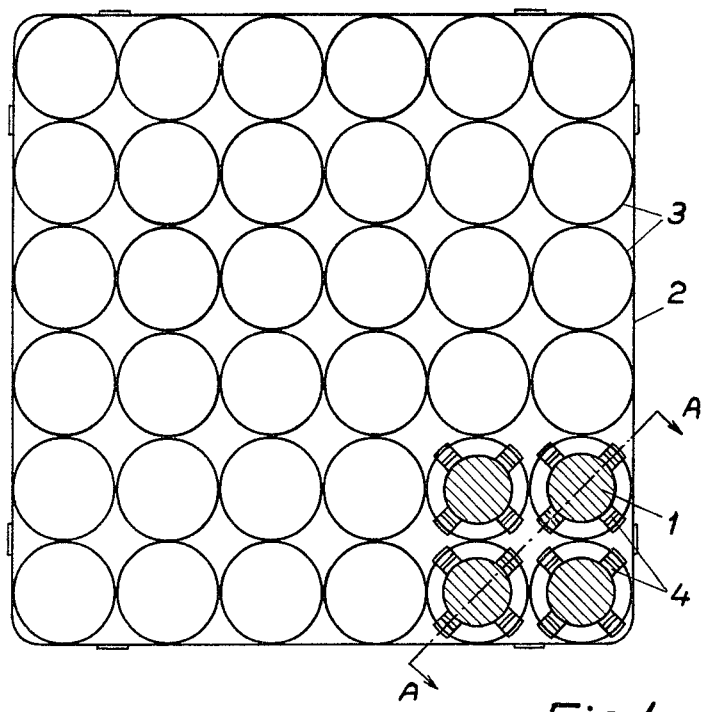
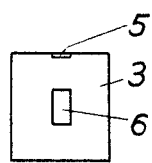
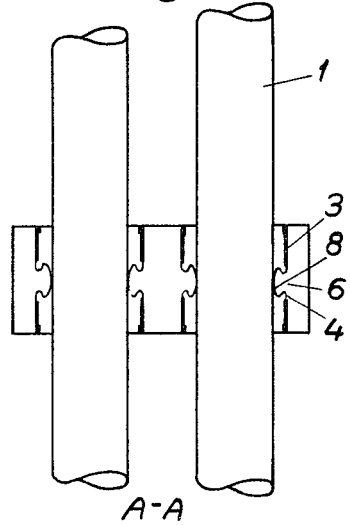
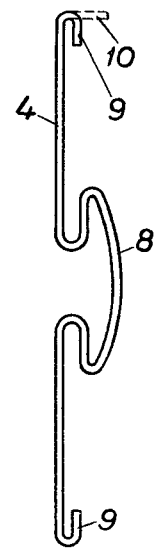
INVENTORS
Constan Glandin
Erik Olov Jansson
BY
Bailey, Stephens & Huettig
ATTORNEYS April 30, 1968 C. GLANDIN ET AL 3,380,890
SPACER FOR FUEL ASSEMBLIES
Filed May 17, 1965 5 Sheets-Sheet 2
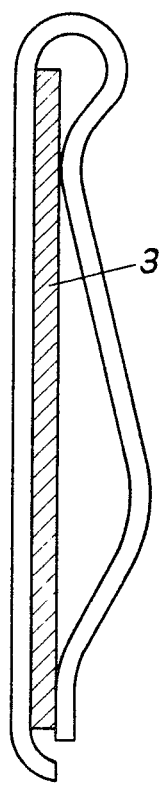
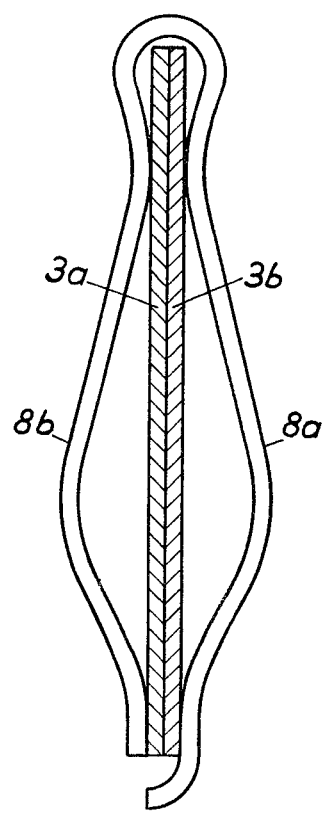
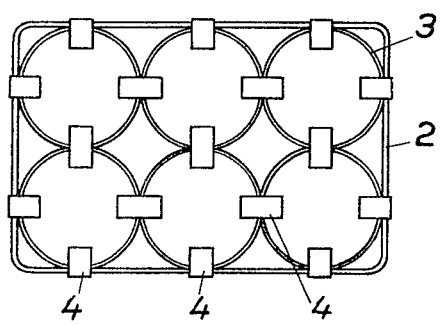

United States Patent Office 3,380,890
Patented Apr. 30, 1968

3,380,890
SPACER FOR FUEL ASSEMBLIES
Constan Glandin and Erik Olov Jansson, Vasteras,
Sweden, assignors to Allmänna Svenska Elektriska
Aktiebolaget, Vasteras, Sweden, a corporation of
Sweden
Filed May 17, 1965, Ser. No. 456,234
Claims priority, application Sweden, Dec. 31, 1964,
15,923/64
7 Claims. (Cl. 176—78)

The present invention refers to a fuel assembly for nuclear reactors which comprises a number of parallel fuel rods and spacers for fixing the distance between the fuel rods. In fuel assemblies which comprise a plurality of parallel fuel rods, the end of the rods and often also a plurality of points between the ends must be fixed with the help of so-called spacers in order that the distance between the rods may be kept constant for the whole length of the rods. During operation the rods are subject to vibrations and the spacers must therefore be of relatively robust construction. In order to avoid wearing vibration movements between the fuel rods and the spacers, a certain resilient support pressure must be maintained between them. During the assemblage however the support between the spacers and the fuel rods should not cause scratches in the coating of the fuel rods. The contact surface between the fuel rods and the spacers should not be too large either, since in such a case the flow of the coolant is prevented at this point and local overheating occurs. The coolant flow around the fuel rods should not in other respects be prevented by the spacers to any appreciable extent. Known spacer constructions do not completely fulfill the above mentioned requirements and are besides often relatively complicated and expensive to manufacture.

The object of the present invention is to effect a simple spacer, easy to assemble, causing but little strain upon the fuel rods mechanically as well as thermically and preventing only to a very small degree the cooling water flow through the fuel assembly. By means of the invention the advantage is also attained that faults in a part of the spacer can in most cases only lead to one of the fuel rods becoming loose, while the fixing of the remaining fuel rods is not affected. Besides, a stable spacer construction is attained which counteracts oscillations in the fuel assembly.

The invention is characterized in that the spacers each comprise a rigid spacer body formed of tube elements surrounding the fuel rods and spacer springs fastened to the tube elements and arranged to bear against the fuel rods. The spacer springs can be made of spring elements separated from each other, of which at least three, preferably four, are arranged to bear against one and the same fuel rods and which are fitted on the spacer body during the assemblage of the fuel assembly. The springs can also be permanently connected with the spacer body and arranged so that adjacent their support points against the fuel rods they can be pressed together with a pinching tool to make it possible freely to set in or take out a fuel rod. The spacer body can with advantage be formed of circular tube elements, but other cross sections of the tube elements are feasible. The tube element with four sided polygonal cross section can for example be simply effected by means of a frame being provided with a number of preferably groupwise parallel intermediate walls crossing each other.

Figure 9:
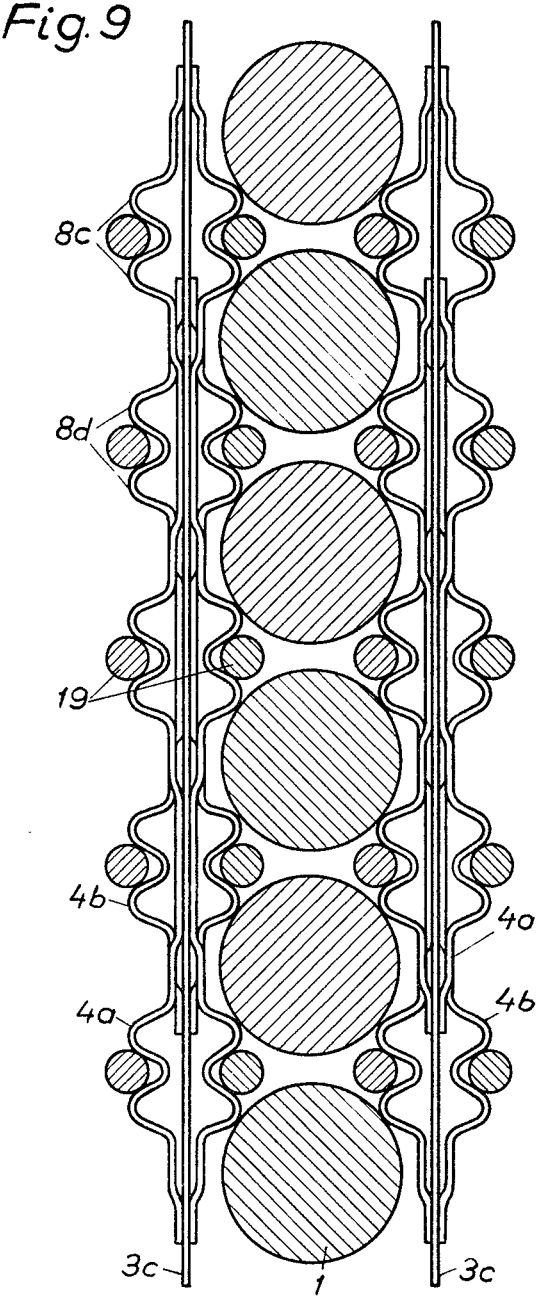
Figure 10:
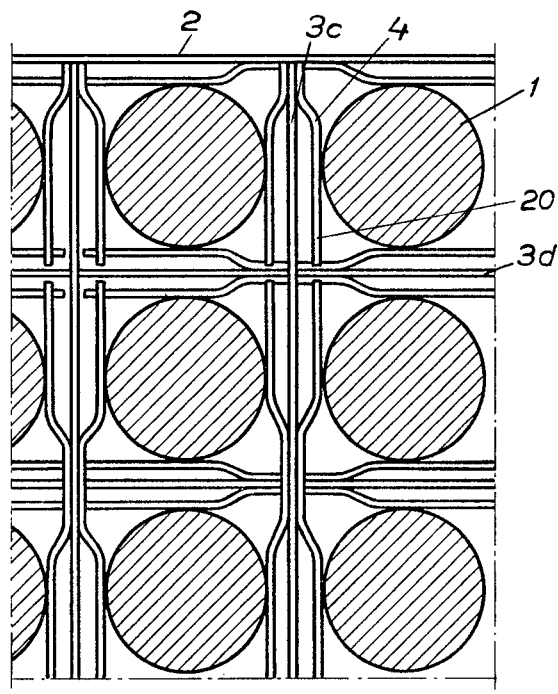

The invention will now be described more fully with reference to the accompanying figures which show schematically different embodiments of the invention. FIG. 1 shows an axial view of a spacer according to a first embodiment of the invention. FIG. 2 shows a side view of one of the tube elements of the spacer shown in FIG. 1. FIG. 3 shows the section A—A in FIG. 1. FIG. 4 shows on a greater scale a side view of a type of spacer spring. FIGS. 5 and 6 show spacer springs of another type. FIG. 7 shows an axial view of a fuel assembly intended for spacer springs according to FIG. 6. FIG. 8 shows an axial view of a spacer according to another embodiment of the invention. FIG. 9 shows on a greater scale the arrangement of the spacer springs in the spacer according to FIG. 8. FIG. 10 shows a detail of a spacer according to a third embodiment of the invention.

In the figures, 1 designates the fuel rods and 2 the outer frame of the spacer body. Inside the frame 2 the spacer body comprises a number of circular, rectangular or square tube elements 3, which are arranged in rows at right angles to each other and soldered or welded to each other at the contact points and also in the same way attached to the frame 2. The soldering is effected suitably by means of furnace soldering. In FIGS. 1 and 7 the tube elements 3 are circular, in FIG. 8 rectangular and in FIG. 10 square.

In FIG. 1 only a few of the fuel rods 1 have been drawn in their respective tube elements. The rods 1 are fixed in the centres of the tube elements 3 by means of spacer springs 4, of which four are fastened on each tube element. The spacer body is manufactured suitably of a material with low neutron absorbing properties, for example of the alloy Zircaloy 2. Stainless steel is also a suitable material in certain types of reactor.

In FIG. 2 a tube element 3 is shown, seen from the side. At one edge of the tube there is a cut 5 for peripheral fixing of the spacer spring. In the middle of the tube element there is an opening 6 through which a support member arranged on the spacer spring extends for bearing against the fuel rod.

The mounting of the spacer springs is shown more clearly by FIG. 3. In the embodiment shown the spacer springs 4 are mounted on the outside of the tube element 3 and the support member 8 extends through the previously mentioned opening 6.

In FIG. 4 the spacer spring according to FIGS. 1 and 3 is shown on a greater scale, seen from the side. The spacer spring 4 is made of a bent plate strip of some suitable spring material, for example a tempered nickel-chrome-iron alloy. The support member 8 is in the embodiment according to the figure manufactured as a bent part of the spring plate. Through this embodiment the advantage is gained that the support body itself also becomes resilient and that smaller movements in the axial as well as in the radial direction can be effected by the spacer spring without any sliding at the surface of contact with the fuel rod taking place. In order that the spacer spring may be axially yielding it is important that the connection between the support member 8 and the web of the spring is relatively pliable. This has been effected in the embodiment according to the figure by giving the support member 8 a mushroom-like shape. By this means the support member also becomes resilient in the radial direction. It can of course also be feasible to make the spacer spring with a separately mounted support member instead of the bent part 8, as long as this is more suitable. The spacer springs are provided at their ends with gripping flanges 9 one of which at least is usually first bent to the correct position during mounting. In such a case the spring has the form which is shown in broken lines at 10 before it is mounted on the tube element of the spacer body. If the bend 8 permits axial elongation of the spacer spring, it is possible to have the gripping flanges 9 completed before mounting.

Mounting of the spring elements of a fuel rod position can be carried out after the fuel rod has been inserted in this position or the fuel rods can be inserted afterwards in the complete spacer. The latter process however requires the fuel rods to be protected against scratching, for example by using protecting intermediate layers of plastic or the like, which are removed after the completion of the mounting. It can also be suitable to secure the fastening of the springs by soldering or possibly by welding.

FIG. 5 shows a spacer spring of another construction. This spring is intended to be drawn over the tube element. This spring shape can be easily modified so that it becomes double-acting as shown in FIG. 6. The spring is here formed with two support members 8a and 8b in the form of bent arcs. This spring type is used suitably in cases where the spring it fitted at the contact line between two tube elements 3a and 3b lying near each other. An example of a spacer of this type is shown in FIG. 7. Specially with this type of spacer, cross sections of the tube element other than the circular type can be suitable, for example a six-sided shape which gives a relatively rigid spacer body.

In FIGURE 8, as previously, 1 designates the fuel rods and 2 the frame of the spacer body. The tube elements 3 are made of parallel intermediate walls 3c and 3d crossing each other in groups. The intermediate walls surround the fuel rods 1 in such a way that two fuel rods are located in each tube element or partition formed by the intermediate walls 3c and 3d. At the intermediate walls 3c, spacer springs 4 are fastened. The spacer springs consist of wave-shaped spring strips, which bear against the fuel rods 1 at four points. During the setting in or taking out of the fuel rods, pinching devices are arranged at the section 16 on the spacer springs, these being clamped together so that the fuel rods can be freely displaced in axial direction. In order to fix the spacer in the axial direction in relation to the fuel rods some of the fuel rods are divided in such a way that the parts can be joined together on each side of ring-shaped fixing discs 17 arranged in the spacer. Since the spacer springs 4 are only fastened at the intermediate walls 3c, it is particularly suitable to make the intermediate walls 3d lower so that they do not reach up to the springs 4. A very simple form of spacer is effected by this means.

In the described embodiment, the fuel rods at the corner of the spacer body only receive three-sided support because of the form of the spring system. It is therefore suitable to round off the corners of the spacer body frame and to fit there spacer springs 11 of any of the types which are shown in FIGS. 4 and 5.

In FIG. 9 two intermediate walls 3c are shown, intended for a spacer according to FIG. 8 with spacer springs 4a and 4b fastened on it. The springs 4a comprise three double waves 8c and the springs 4b two similar double waves 8d. The fuel rods 1 have support against the spring waves 8c and 8d at four points so that connecting lines drawn between the support points diametrically across the cross section of the fuel rods are at an angle of 45° to the intermediate walls. The springs 4a are fastened above the springs 4b at the left intermediate wall and inversely at the right intermediate wall. The waves 8c and 8d at one intermediate wall thus bear on a different level against the fuel rods. In order that the fuel rods in the attachment zone shall not be exposed to a bending moment, the springs 4a and 4b are arranged at the other intermediate wall in such a way that the levels of the springs 4a and 4b are inverted. This inversion of the level of the springs means that in relation to the fuel rods the springs lying diametrically opposite each other are situated at the same level. There is thus no bending of the fuel rods because of spring forces. In the drawing the pinching devices 19 are indicated which at mounting of the fuel rods are placed in the middle of the double waves 8c and 8d and tightened in the direction towards the intermediate wall 3c so that the springs are pressed together. At their support surfaces against the intermediate wall 3c the springs are fixed by welding, preferably by means of so-called electronic beam welding.

In FIG. 10 an embodiment in which the spacer springs 5 are fastened to the intermediate walls 3c and 3d is shown, so that they have free-bearing tongues 20, which bear against the fuel rods 1. The intermediate walls 3c and 3d enclose the fuel rods so that only one fuel rod is in each partition formed of the intermediate walls. Also in this embodiment the spacer springs 4 are arranged at different levels. It is therefore also suitable in this case to make the one group of parallel intermediate walls lower than the other in order to simplify the building up of the spacer. The tongues of the springs bearing against the fuel rods are substantially parallel with the intermediate walls and the fuel rods will thus be influenced by the springs parallel with the intermediate walls.

The spacer springs 4 are fastened to the intermediate walls at their middle part and the free-bearing tongues 20 of several springs extend at both sides from the attachment part. The pinching device for pressing together the springs can easily be arranged near the ends of the tongues 20.

The invention is not limited to the shown embodiments, but several variations and modifications are feasible within the scope of the following claims.

We claim:
1. In a fuel assembly for nuclear reactors comprising a plurality of parallel fuel rods and spacers fixing the distance between the fuel rods, said spacers each comprising a rigid spacer body of grid-like configuration enclosing said fuel rods and spacer springs of resilient material different from the material of the spacer body attached to said spacer body and bearing against said fuel rods, said spacer springs being permanently fastened to said spacer body, said spacer springs having parts which engage said fuel rods mounted for pressing together with a pinching tool to make it possible to freely displace a fuel rod of the assembly in axial direction, said spacer body comprising an outer frame having a plurality of intermediate walls crossing each other connected thereto, said spacer springs being formed of strip elements fastened along a plurality of said intermediate walls, said spring elements being fastened at two different levels, two spring elements bearing against a fuel rod diametrically one on each side being arranged at the same level.

2. In a fuel assembly for nuclear reactors comprising a plurality of parallel fuel rods and spacers fixing the distance between the fuel rods, said spacers each comprising a rigid spacer body of grid-like configuration enclosing said fuel rods and spacer springs of resilient material different from the material of the spacer body attached to said spacer body and bearing against said fuel rods, said spacer springs being permanently fastened to said spacer body, said spacer springs having parts which engage said fuel rods mounted for pressing together with a pinching tool to make it possible to freely displace a fuel rod of the assembly in axial direction, said spacer body comprising an outer frame having a plurality of intermediate walls crossing each other connected thereto, said intermediate walls forming spaces enclosing at least two fuel rods.

3. In a fuel assembly according to claim 2, said spacer springs comprising wave-formed spring strips fastened to intermediate walls which are parallel to each other.

4. In a fuel assembly according to claim 3, said spring strips being fastened to said intermediate walls at both ends of the strips.

5. In a fuel assembly according to claim 4, said spring strips having opposite wave form projections bearing against the fuel rods at points in a line at an angle of approximately 45° to said intermediate walls.

6. In a fuel assembly according to claim 5, said spring strips in two rows at different levels bearing against a row of fuel rods and having their wave pattern displaced in relation to each other and in relation to similar spring strips situated on the opposite side of said row of fuel rods, the displacement being the same as the pitch in said fuel rod row.

7. In a fuel assembly for nuclear reactors comprising a plurality of parallel fuel rods and spacers fixing the distance between the fuel rods, said spacers each comprising a rigid spacer body of grid-like configuration enclosing said fuel rods and spacer springs of resilient material different from the material of the spacer body attached to said spacer body and bearing against said fuel rods, said spacer springs being permanently fastened to said spacer body, said spacer springs having parts which engage said fuel rods mounted for pressing together with a pinching tool to make it possible to freely displace a fuel rod of the assembly in axial direction, said spacer body comprising an outer frame having a plurality of intermediate walls crossing each other connected thereto, said intermediate walls forming spaces each enclosing only one fuel rod and said spacer springs comprising resilient parts in the form of free-bearing tongues substantially parallel with said intermediate walls.

References Cited

UNITED STATES PATENTS

| | | | |
|---|---|---|---|
| 1,681,110 | 8/1928 | Friedman | 220—16 X |
| 3,070,534 | 12/1962 | Kooistra | 176—78 |
| 3,182,003 | 5/1965 | Thorp et al. | 176—78 |
| 3,212,991 | 10/1965 | Brynsvold et al. | 176—78 |
| 3,230,152 | 1/1966 | Kerze | 176—76 |
| 3,240,680 | 3/1966 | Laithwaite et al. | 176—76 X |

FOREIGN PATENTS

| | | |
|---|---|---|
| 1,339,914 | 9/1963 | France. |
| 973,137 | 10/1964 | Great Britain. |

L. DEWAYNE RUTLEDGE, *Primary Examiner.*

BENJAMIN R. PADGETT, CARL D. QUARFORTH,
*Examiners.*

M. J. SCOLNICK, *Assistant Examiner.*